United States Patent
Prevey, III

(10) Patent No.: US 8,307,681 B2
(45) Date of Patent: Nov. 13, 2012

(54) INTEGRALLY ROTATING TURBO MACHINERY AND METHOD AND APPARATUS FOR ACHIEVING THE SAME

(76) Inventor: Paul S. Prevey, III, Cincinnati, OH (US)

(*) Notice: Subject to any disclaimer, the term of this patent is extended or adjusted under 35 U.S.C. 154(b) by 0 days.

(21) Appl. No.: 12/806,767

(22) Filed: Aug. 20, 2010

(65) Prior Publication Data

US 2011/0085913 A1   Apr. 14, 2011

Related U.S. Application Data

(62) Division of application No. 11/546,970, filed on Oct. 12, 2006, now Pat. No. 7,805,972.

(60) Provisional application No. 60/726,038, filed on Oct. 12, 2005.

(51) Int. Cl.
*C21D 7/06* (2006.01)

(52) U.S. Cl. .................. 72/53; 72/75; 29/90.01

(58) Field of Classification Search .............. 72/53, 407, 72/419, 420, 422, 31.02, 31.03, 67, 75; 29/90.7, 29/90.01; 219/121.76, 121.82, 121.85
See application file for complete search history.

(56) References Cited

U.S. PATENT DOCUMENTS

| | | | | |
|---|---|---|---|---|
| 2,197,891 A * | 4/1940 | Kriechbaum | ................. | 76/89.2 |
| 3,668,913 A * | 6/1972 | Morris | ................. | 72/53 |
| 4,539,461 A * | 9/1985 | Benedict et al. | ............. | 148/565 |
| 5,666,841 A * | 9/1997 | Seeger et al. | ................. | 72/110 |
| 5,713,233 A * | 2/1998 | McCarthy et al. | ........... | 72/31.02 |
| 6,570,125 B2 * | 5/2003 | Suh et al. | ................. | 219/121.76 |
| 6,629,464 B2 * | 10/2003 | Suh et al. | .................. | 73/602 |
| 7,140,216 B2 * | 11/2006 | Garza | ................. | 72/53 |
| 7,217,102 B2 * | 5/2007 | Rockstroh et al. | ............. | 416/235 |
| 7,337,640 B1 * | 3/2008 | Linden et al. | ................ | 72/31.02 |
| 7,481,088 B2 * | 1/2009 | Bayer et al. | ................. | 72/53 |
| 7,600,404 B2 * | 10/2009 | Prevey, III | ................. | 72/75 |
| 7,887,288 B2 * | 2/2011 | David | .................. | 415/200 |
| 7,971,463 B2 * | 7/2011 | Forrest et al. | ................. | 72/67 |
| 2006/0277753 A1 * | 12/2006 | Ntsama-Etoundi et al. | . | 29/889.1 |

OTHER PUBLICATIONS

Information Disclosure Statement filed Dec. 22, 2006 in U.S. Appl. No. 11/546,970, plus non-patent references.
Office Action mailed Oct. 8, 2008 in U.S. Appl. No. 11/546,970.
Office Action mailed Jan. 7, 2009 in U.S. Appl. No. 11/546,970.
Office Action mailed Jul. 23, 2009 in U.S. Appl. No. 11/546,970.
Supplemental Information Disclosure Statement dated Nov. 25, 2009 filed in U.S. Appl. No. 11/546,970 incl. PCT Search Report & Written Opinion in corresponding PCT application (PCT/US06/40033.
Office Action dated Feb. 3, 2010 in U.S. Appl. No. 11/546,970.

* cited by examiner

*Primary Examiner* — Edward Tolan
(74) *Attorney, Agent, or Firm* — Mark F. Smith; Smith Brandenburg Ltd.

(57) ABSTRACT

A method of inducing compressive residual stress of blading members integrally formed with a rotor. The method includes using a caliper-type burnishing tool such that the caliper arms of the tool are contoured and oriented for placing the burnishing elements on opposite sides of the blading member to be treated. The blading member is burnished to introduce a predetermined pattern of residual compressive stresses in a selected area of the blade.

11 Claims, 5 Drawing Sheets

FIG. 4: Flow Chart of the method for improving the resistance to stress related failure mechanisms of an integrally bladed rotor

INTEGRALLY ROTATING TURBO MACHINERY AND METHOD AND APPARATUS FOR ACHIEVING THE SAME

This application is a divisional application of and claims benefit of U.S. patent application Ser. No. 11/546,970, filed Oct. 12, 2006 now U.S. Pat. No. 7,805,972, which claims benefit of U.S. Provisional Application No. 60/726,038, filed Oct. 12, 2005.

ACKNOWLEDGMENT OF FEDERAL GRANTS

The U.S. Government may have certain rights in this invention pursuant to contract number F33615-03-C-5207 awarded by the U.S. Department of the Air Force.

TECHNICAL FIELD

The present invention relates generally to rotating turbo machinery, and, more specifically, to an integrally bladed rotor or disk having improved fatigue performance, greater foreign object damage tolerance, and increased resistance to stress related failure mechanisms due to the introduction of compressive residual stresses through burnishing and a method and apparatus for producing the same.

BACKGROUND

The high vibratory and tensile stresses experienced by rotating turbo machinery in operation, particularly the blading members of the fan, compressor, and turbine stages in gas turbine engines, make such components susceptible to high cycle fatigue (HCF) and other stress related failure mechanisms such as stress corrosion cracking (SCC). HCF and SCC ultimately limit the service life of these components as prolonged exposure to such extreme operating conditions leads to the development of fatigue cracks in areas of the component subject to high operational stresses. The fatigue life of a component is further limited by the occurrence of foreign object damage (FOD). FOD locations act as stress risers or stress concentrators that hasten the development and propagation of fatigue cracks. FOD, especially along the leading and trailing edges of blading members, significantly reduces the service life of aerospace components.

The potentially catastrophic effects of HCF and FOD require that fatigue-life limited components be periodically inspected for both cracks and FOD. Any damage or cracking found during inspection is assessed and the component is retired from service due to the extent of the damage or else repaired and returned to service. The inspection of parts and the retirement of parts from service adversely impacts both flight readiness and maintenance costs of the aircraft.

Integrally formed components, such as rotors integrally formed with blading members, also known in the industry as blisks (bladed-disks), blings (bladed-rings), and IBRs (Integrally Bladed Rotors), incur significant maintenance and repair costs due to stress related failure mechanisms and FOD. This is a direct result of their integral or unitary design as opposed to more traditional rotating turbo machinery, such as bladed rotors, where individual components of the construct, such as individual blading members, can be separately removed and repaired or replaced when damage is discovered or the component has reached its pre-determined service life.

FOD and stress related cracking in a single blading member of an integrally formed component may directly impact the integrity of the entire component. Because the integrally formed blading members are not readily removable or replaceable in the event of such damage, an entire integrally bladed rotor may be withdrawn from service due to damage confined to a single blading member. The repair and/or replacement of such a complex component is expensive, both monetarily and from a flight readiness perspective.

The need to replace or repair integrally bladed rotating turbo machinery may be significantly reduced if the fatigue strength, FOD tolerance, and resistance to stress related failure mechanisms of new, serviced, and repaired components can be improved or restored to the as-manufactured condition. Common methods of improving the fatigue strength and foreign object damage tolerance of aerospace components include the introduction of residual compressive stresses in critical areas susceptible to damage and fatigue failure such as the edges and tips of blading members. Introducing compressive residual stresses improves the fatigue properties and foreign object damage tolerance of both new and repaired blading members. This decreases operation and maintenance costs and increases the flight readiness of the aircraft in which the component is employed.

One method currently used to introduce compressive residual stresses in the blading members of integrally bladed rotating turbo machinery is laser shock peening (LSP) as disclosed in U.S. Pat. No. 6,541,733. LSP uses a high power laser system to impart compressive residual stresses at discrete locations on both sides of the integrally formed airfoil or blading member. However, LSP processing each blade of an integrally bladed rotor is labor intensive, time consuming, and expensive.

Burnishing, also referred to as deep rolling, is an equally effective, less expensive, and more time efficient alternative to LSP for inducing compressive residual stresses in the surface of a part. Burnishing, particularly ball burnishing as disclosed in U.S. Pat. Nos. 5,826,453, 6,415,486, and 6,622,570, has been shown to effectively increase the fatigue strength and FOD tolerance of aerospace components, such as airfoils and turbine disks, and to substantially mitigate or eliminate stress induced failure mechanisms.

While burnishing is generally well suited for aerospace applications, the geometrical complexity and unitary design of some aerospace components, such as integrally bladed rotors, does not readily permit the use of current, commercially available burnishing tools to introduce compressive residual stresses in the individual, integrally formed blading members. As a practical matter, the complex shape of the blading members and the narrow spacing between individual blading members of the integrally bladed rotor does not provide adequate clearance to permit the use of current tool designs to accomplish the introduction of compressive residual stress.

Accordingly, a need exists for an efficient and cost effective method of imparting residual compressive stresses in the individual blading members of integrally bladed rotating turbo machinery to either improve or restore the fatigue performance and/or resistance to stress related failure mechanisms of the blading members thereof.

DISCLOSURE OF THE INVENTION

A rotor integrally formed with blading members for a turbine or turbo machinery having improved fatigue performance, FOD tolerance, and resistance to stress related failure mechanisms is produced by introducing compressive residual stresses in the surface of the individual blading members. The rotor is mounted on the worktable of a CNC machine tool. A caliper burnishing tool is positioned relative to the individual blading member to be treated. The geometry of the burnishing tool is such that it can be positioned relative to the blading member to be treated without contacting or otherwise interfering with adjacent blading members. The blading member is burnished introducing compressive residual stresses in the surface of the blading member. The burnishing tool is withdrawn and the rotor is rotated such that a subsequent blading member may be treated.

One embodiment of the present invention is a rotor integrally formed with blading members having improved fatigue performance and increased tolerance to FOD as a result of compressive residual stresses introduced in individual blading members by burnishing.

In another embodiment, the present invention is a method for improving the fatigue performance and FOD tolerance of a rotor integrally formed with blading members by introducing compressive residual stresses in the blading members of the rotor by burnishing.

In another embodiment, the present invention is an apparatus for inducing compressive residual stresses in blading members integrally formed with a rotor thereby improving the fatigue performance and FOD tolerance of the rotor. The apparatus consists of two burnishing elements oriented in opposition to one another such that a blading member may be disposed therebetween. This facilitates the simultaneous introduction of compressive residual stresses on both surfaces of the blading member. The burnishing elements are disposed in contoured caliper arms that conform to the complex geometry of the blading member and permit the in situ treatment of individual blading members of a rotor.

Other aspects, advantages and embodiments of the invention will be apparent from the following description and the appended claims.

BRIEF DESCRIPTION OF THE DRAWINGS

These and other features, aspects, and advantages of the present invention will become better understood with regard to the following description, appended claims, and accompanying drawings where:

BEST MODE FOR CARRYING OUT THE INVENTION

Figure 1:
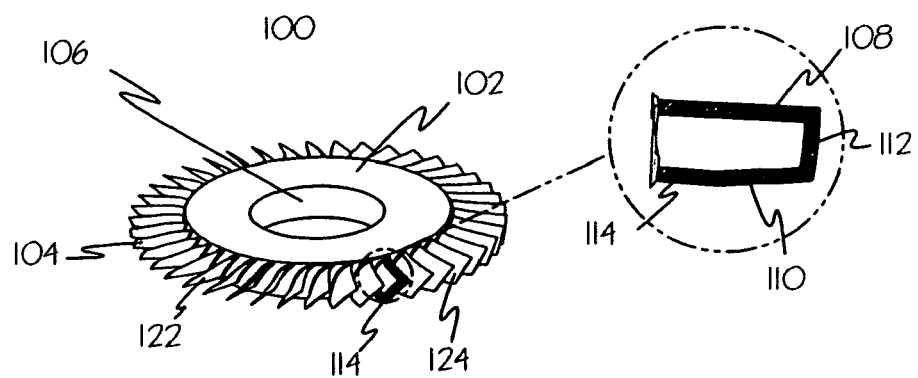
FIG. 1 is a schematic illustration of a rotor integrally formed with blading members treated according to the current invention.

The present invention relates to rotating turbo machinery integrally formed with blading members having improved or restored resistance to fatigue, FOD, and stress related failure mechanisms. As shown in FIG. 1, the rotor 100 consists of a central disk 102 integrally formed with blading members 104 spaced about the periphery and extending radially outward from the center 106 of the rotor. The blading members 104 are defined by a leading edge 108, a trailing edge 110, a tip 112, a pressure side 122, and a suction side 124.

Using a burnishing process, compressive residual stresses are induced in the blading members 104 of the rotor 100 in continuous compressive zones 114, on both the pressure side 122 and the suction side 124, along the leading edge 108, trailing edge 110, or tip 112, and combinations thereof, in locations on the blading member where damage and failures are known to occur. The continuous compressive zones 114 wherein compressive residual stresses are induced are identified by operational experience of the component, testing, or mathematical modeling of the residual and applied stress state of the component, and combinations thereof. The location and shape of the continuous compressive zones 114 are designed to offset areas of residual tensile stress and high applied stress or to mitigate FOD known to occur in the general area through operational experience. In one embodiment, the compressive residual stresses extend substantially through the thickness of the blading members from both the pressure side 122 and the suction side 124 such that the entire cross section of the blading member is under compressive stress.

In a preferred embodiment of the invention, the compressive residual stresses induced in the blading members 104 of the rotor 100 have an associated cold work on the order of less than about 5%, preferably less than about 3.5% in order to create thermally and mechanically stable compressive residual stresses.

In another preferred embodiment of the invention, the continuous zones of compressive residual stress 114 have an improved surface finish as a result of the burnishing method used to induce the residual compressive stresses, which, in turn, benefits the aerodynamic efficiency of the blading members 104. The improved surface finish is in the range of about 5 μin. to 20 μin., depending on the alloy from which the blading members 104 are manufactured and the characteristics of the burnishing tooling used. Common alloys used in this type of aerospace application include, but are not limited to, titanium alloys, stainless steels, and nickel-base alloys.

For purposes of the current invention, prior to burnishing, the rotor 100 may be in the as manufactured condition, such as a new rotor or a rotor at an intermediate manufacturing step or a rotor with no operational service time. Alternatively, the rotor 100 may have been previously fielded and therefore subject to reduced performance due to operational stress and/or FOD.

Figure 2:
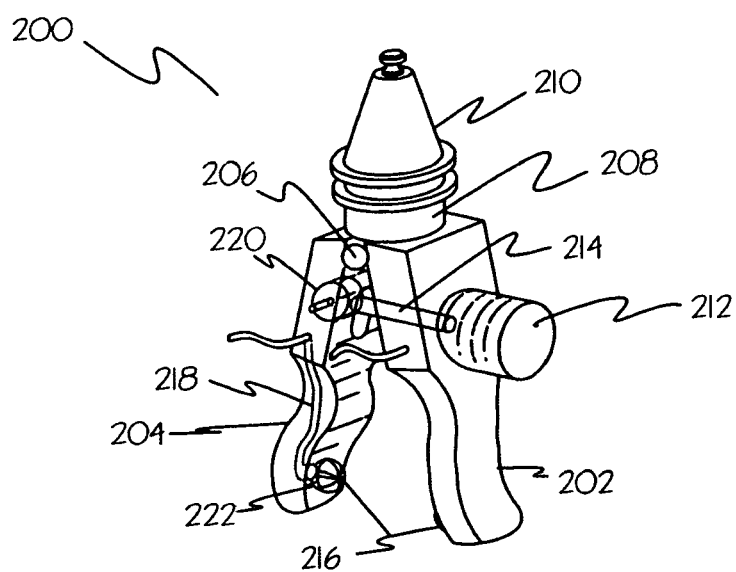
FIG. 2 is a schematic drawing of one embodiment of the burnishing tool that is a subject of the present invention.

A preferred embodiment of the apparatus of the present invention is shown in FIG. 2. The apparatus 200 is a caliper-burnishing tool configured as a second-class lever with a first caliper arm 202 and a second caliper arm 204 in pivotal opposition to one another about a pivot point 206. The anterior surfaces of the first caliper arm 202 and the second caliper arm 204 are shaped to facilitate insertion of each caliper arm between the blading member being treated and adjacent blading members. In addition, the interior surfaces of the first caliper arm 202 and the second caliper arm 204 are contoured to conform to the complex surface geometry of the blading member being treated.

Figure 6:
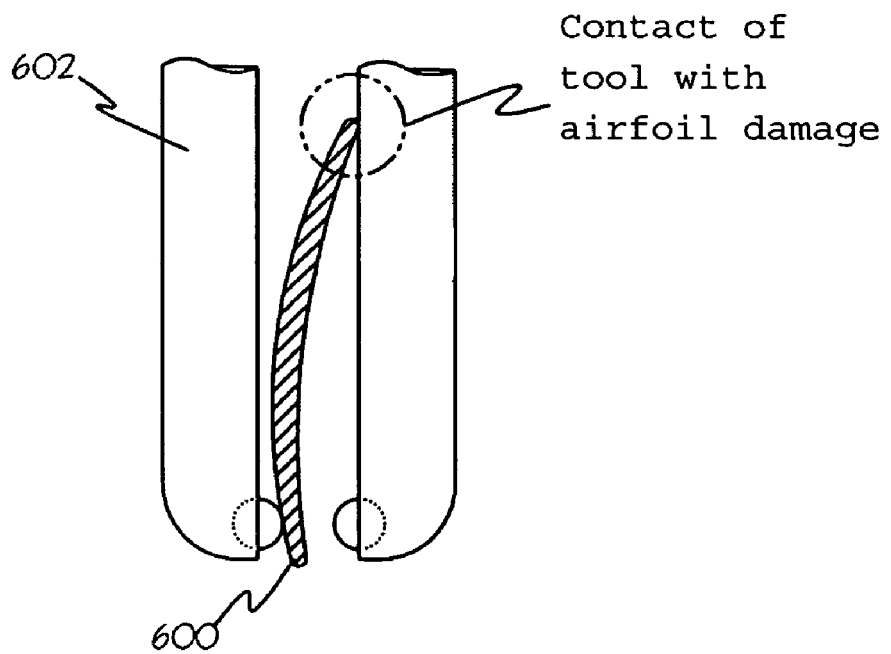
FIG. 6 is a schematic drawing showing a prior art caliper-type burnishing tool.
Figure 7:
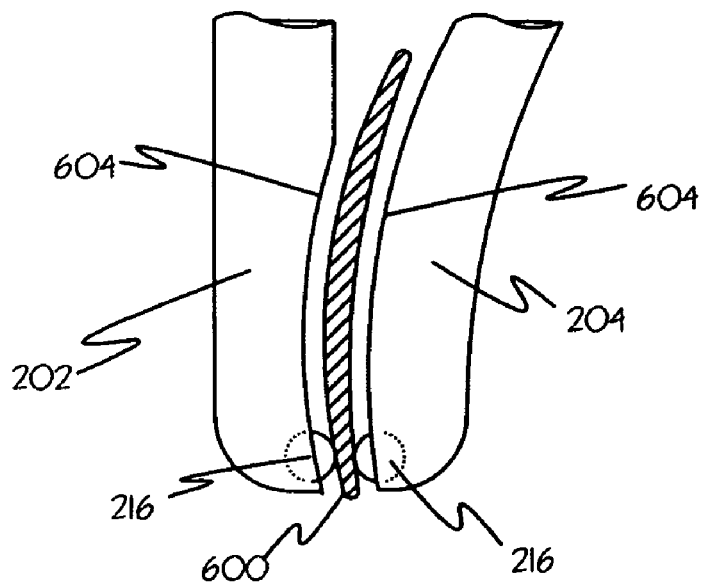
FIG. 7 is a schematic drawing showing the apparatus of the present invention having contoured interior surfaces.

The benefit of the curved interior surfaces of the first caliper arm 202 and the second caliper arm 204 is shown in FIG. 6. FIG. 6 shows a conventional straight-armed caliper burnishing tool 602 positioned relative to an airfoil 600 shown in cross section. The airfoil 600 has a complex, curved geometry in the chord-wise direction. The burnishing elements of the conventional straight-armed caliper tool 602 are unable to contact all points along the curved surface of the airfoil 600 without the caliper arm also contacting the airfoil 600 and potentially damaging the airfoil 600. As shown in FIG. 7, the apparatus 200 of the subject invention is shown wherein the caliper arms 202 and 204 comprise curved interior surfaces 604 that operate to facilitate the treatment of the entire curved surface of the airfoil 600 by maintaining sufficient clearance between the caliper arms 202 and 204 and the airfoil 600 thereby reducing the risk of damage to the airfoil 600.

Referring again to FIG. 2, the pivot point 206 is attached to a base 208, which, in turn, is attached to a tool holder 210 that facilitates insertion of the apparatus 200 into the chuck of a CNC machine tool or other positioning device including, but not limited to, robotic positioning devices.

The first caliper arm 202 and the second caliper arm 204 are pivoted about the pivot point 206 by an actuator 212 located below the pivot point 206. The actuator 212 mechanically links the first caliper arm 202 and the second caliper arm 204 via the linkage 214. The actuator 212 may be selected from the list including, but not limited to, hydraulic cylinders, pneumatic cylinders, electromagnetic solenoids, and mechanical actuators such as springs.

The first caliper arm 202 and second caliper arm 204 each have burnishing elements 216 oriented in opposition to one another on the interior surface 604 (FIG. 7) of each caliper arm and disposed within sockets 222 distally located from the pivot point 206. Preferably the burnishing elements 216 are in the form of burnishing balls for providing single point burnishing and the sockets 222 are sized and shaped, such as being spherical, to receive the burnishing elements 216. In a preferred embodiment, the sockets 222 are provided with a constant volume flow of fluid via fluid supply lines 218. The constant volume flow of fluid serves to suspend each of the burnishing elements 216 over the surface of their respective socket 222 on a thin film of fluid thereby creating a hydrostatic bearing.

Figure 3:
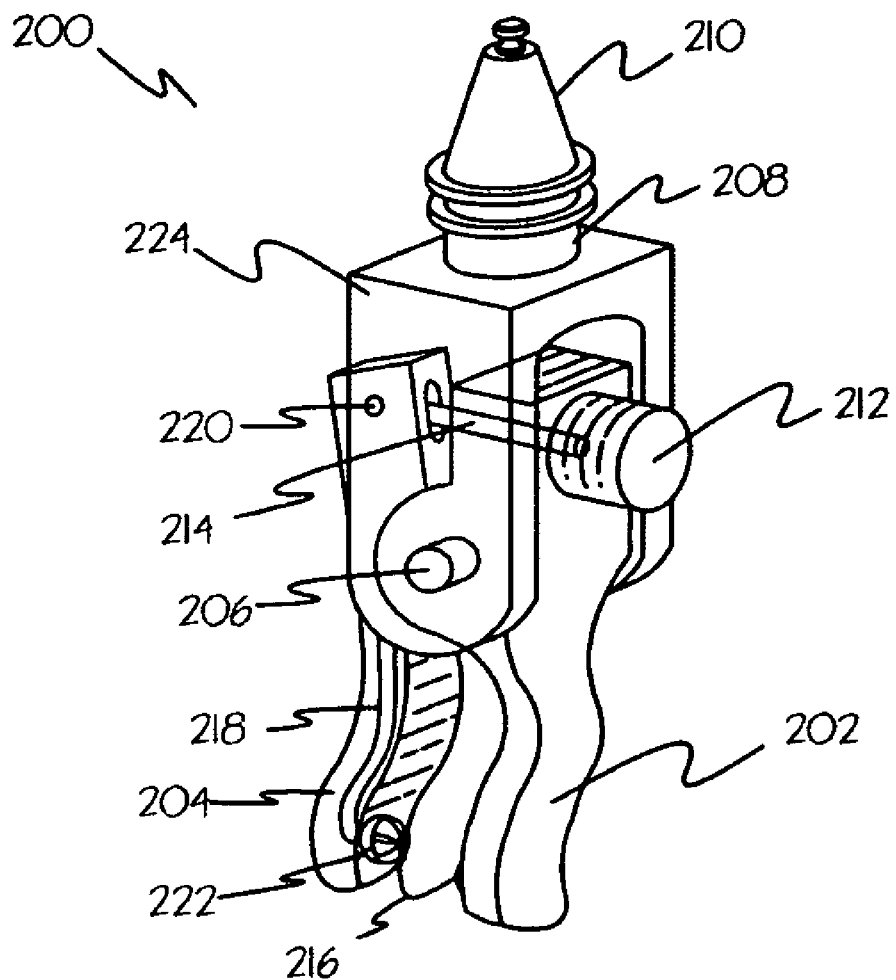
FIG. 3 is a schematic drawing of another embodiment of the burnishing tool that is a subject of the present invention.

In another preferred embodiment of the present invention the apparatus 200 is configured as a first-class lever, as shown in FIG. 3. In this configuration the pivot point 206 is attached to a yoke 224 such that the first caliper arm 202 and the second caliper arm 204 may pivot with respect to each other and the yoke 224. The yoke 224 it attached to the base 208, which in turn, is attached to a tool holder 210.

Referring again to FIG. 2 to illustrate the operability of a preferred embodiment of the apparatus, the apparatus 200 is positioned around a workpiece, such as the blading member 104 of an integrally bladed rotor 100 as shown in FIG. 1, so that the first caliper arm 202 and the second caliper arm 204 are positioned relative to the surfaces of the workpiece (such as the airfoil 600 as shown in FIG. 7) to be treated. A constant volume supply of fluid is provided to the sockets 222 such that the burnishing elements 216 are fluidly supported over the surface of the socket. The actuator 212 is then activated retracting the linkage 214 and advancing the first caliper arm 202 and the second caliper arm 204 towards one another. The workpiece is impinged between the burnishing elements 216. With the burnishing elements 216 in contact with the workpiece, the caliper tool 200 is moved along the surface of the workpiece imparting compressive residual stresses on both sides of the workpiece and substantially through the cross sectional area (thickness T, FIG. 7) of the workpiece. The caliper tool 200 may be advanced along the workpiece in a predetermined pattern thereby imparting the desired amount of residual compressive stress. The depth and magnitude of the induced compressive residual stress relative to locations on the workpiece is preferably precisely and continuously controlled by adjusting the force by which the actuator 212 impinges the burnishing elements 216 against the workpiece as the caliper tool traverses the surface of the workpiece in a predetermined pattern under CNC control.

It should be obvious to one skilled in the art that the burnishing elements 216 may also be pinch-peening elements, indenting elements, coining elements, or roller elements all of which may be used to induce residual compressive stress in the surface of a blading member.

Figure 4:
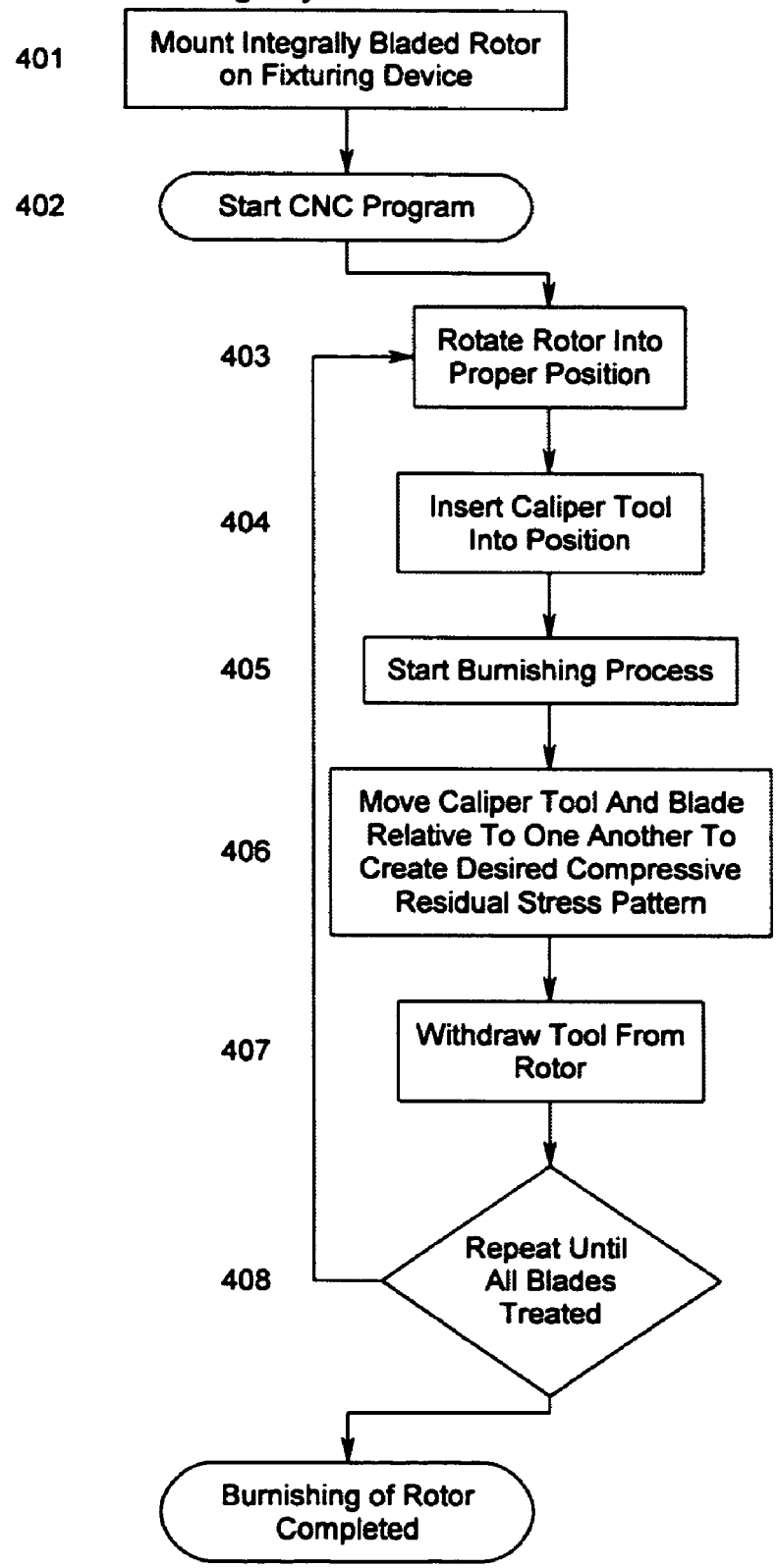
FIG. 4 is a flow chart of the method for improving the resistance to stress related failure mechanisms of a rotor integrally formed with blading members.
Figure 5:
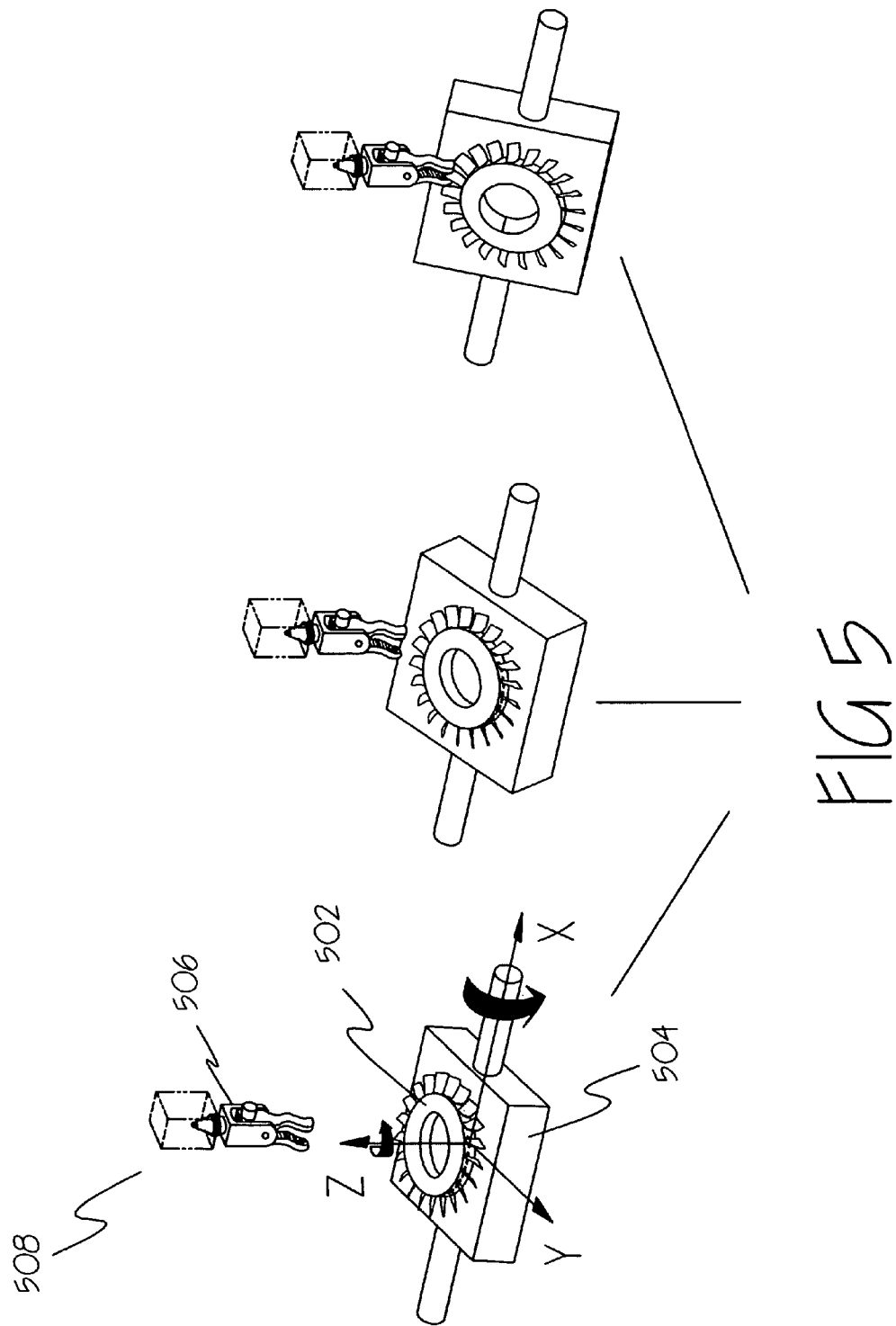
FIG. 5 is a schematic drawing illustrating a preferred embodiment of the method of the current invention.

The method of the present invention may be carried out in a series of steps as shown in FIG. 4. In a first step 401, the rotor integrally formed with blading members is mounted on a fixturing device. As shown in FIG. 5, the fixturing device 504, which is positioned on the x-y table (not shown) of a CNC machine tool such as a vertical mill, permits the precise positioning of the rotor 502 with respect to a caliper-burnishing tool 506 held in the chuck 508 of the machine tool. More specifically, the fixturing device 504 allows for the rotation of the rotor 502 about its normal axis of rotation (the z-axis of FIG. 5) while simultaneously facilitating the rotation of the combination of the rotor 502 and the fixturing device about the x-axis as indicated in the figure. Orientation of the fixturing device 504 and rotor 502 in the x-y plane relative to the caliper-burnishing tool 506 is controlled by the x-y table of the CNC machine tool on which the fixturing device 504 is mounted. The relative positioning of the caliper burnishing tool 506 and the fixturing device 504 along the z-axis is controlled by advancing and retracting the chuck 508 of the CNC machine tool in the direction of the z-axis as well as rotating the fixturing device 504 in the y-z plane. Rotation of the rotor 502, rotation of the fixturing device 504 in the y-z plane, and positioning of the caliper-burnishing tool 506 are accomplished under CNC control.

In a second step 402, a computer program is used in conjunction with the CNC controls of the machine tool to automatically carry out the treatment operation on each of the integrally formed blading members of the rotor. Steps 403 through 408 are accomplished under computer control using CNC code. In a first program step 403, the program rotates the rotor into position such that the proper profile of the blading member is presented to the caliper tool to facilitate treatment of an individual, integrally formed blading member. Referring again to FIG. 5, this is accomplished by rotating the fixturing device 504 in the y-z plane and rotating the rotor 502 about its axis of rotation until the proper profile of an individual blading member is presented to the caliper-burnishing tool 506. The proper profile is obtained when the stacking axis of the individual integrally formed blading member is aligned with the z-axis of the machine tool.

Returning to FIG. 4, in the next program step 404, the caliper tool is lowered into position and inserted between adjacent blading members such that the caliper arms of the tool are located on either side of the blading member being treated. This step is illustrated in FIG. 5. The specific shape of the caliper arms permits the tool to be positioned in this manner without damaging or otherwise interfering with adjacent blading members while the contoured interior surfaces of each caliper arm permit the tool to be positioned in close proximity to the surface of the blading member being treated without damaging the blading member.

In a third program step 405 following insertion of the caliper tool, the burnishing process begins. It is during this step that the caliper tool closes around the blading member such that the burnishing elements of each caliper arm are in contact with opposing surfaces of the blading member. The hydraulic cylinder is actuated to impinge the burnishing elements against both sides of the blading member, thereby imparting residual compressive stresses. The force exerted by the tool against the surface of the blading member is regulated by the pressure of hydraulic fluid supplied to the hydraulic cylinder, which, in turn, is regulated by the CNC program. This permits the pressure exerted against the surface of the blading member, and therefore the induced residual compressive stress, to be precisely controlled and adjusted in conjunction with the position of the treatment apparatus.

In a subsequent program step 406, a predetermined residual compressive stress pattern is imparted in the surface of the blading member by moving both the caliper tool and the rotor relative to one another in a continuous operation. During this step the CNC positioning controls are utilized to precisely control the positioning of both the caliper tool and the rotor. The burnishing elements, which are essentially hydrostatic bearings, in combination with the precision CNC program controls permit the caliper tool to smoothly and accurately follow the unique contours of the individual blading member thereby producing the desired residual compressive stress pattern.

In the fifth program step 407, following the treatment of a single blading member, the tool is withdrawn from the rotor. In a final program step 408, the process is repeated until the desired residual compressive stress patterns have been induced in each of the integrally formed blading members on the rotor.

In a preferred embodiment, the compressive stress pattern imparted provides a compressive residual stress zone that extends along a portion or extends substantially along the entire perimeter, such as the entire leading edge 108, trailing edge 110, and tip 112 (FIG. 1) and inwards towards the center C of the blading member 104.

Referring to FIG. 1, another embodiment of the invention is an article 100, such as a rotor, having a plurality of blading members 104 each having a pressure side 122, a suction side 124 in opposition to one another and a perimeter defined by a leading edge 108, a trailing edge 110, and a tip 112. At least one blading member 104 has continuous zones of compressive residual stress on its pressure side 122 and its suction side 124 such that the continuous zones of compressive residual stress extends substantially along the perimeter and extending inwards in a direction generally towards the center C. It should now be apparent that the article formed such as by the method and apparatus described above, unlike articles formed using laser shocking methods or shot peening methods that produce a plurality of discrete points of compression, has continuous zones of compressive residual stress thereby improving the surface finish of the part and possibly reducing the potential for stress induced damage.

It should be apparent to one skilled in the art that the method and apparatus described herein may also be used to introduce compressive residual stresses in blading members removably connected to a central rotor such as that commonly used in rotating turbines and turbo machinery.

A principle advantage of the apparatus is the ability to introduce beneficial compressive residual stresses in the individual blading members of an integrally bladed component using a mechanical surface treatment such as burnishing. The configuration of the apparatus permits treatment of individual blading members without interfering with or damaging adjacent blading members. Further, the contoured interior surfaces of the caliper arms permit the treatment of curved or complex airfoil surfaces without the risk of damage to the individual airfoil being treated.

Another advantage of the present invention is a low cost method of improving the resistance of an integrally bladed rotating component to stress induced failure mechanisms such as FOD, fatigue, and stress corrosion cracking through the introduction of beneficial compressive residual stresses by a mechanical surface treatment such as burnishing. The method reduces overall manufacturing costs compared to currently employed methods of inducing compressive residual stresses in the blading members of integrally formed rotating components and improves manufacturing throughput.

Another advantage of the present invention is an integrally bladed rotating component with improved resistance to stress related failure mechanisms such as FOD, fatigue, and stress corrosion cracking through the introduction of beneficial compressive residual stress by mechanical surface treatment such as burnishing.

While the method and apparatus described herein constitute preferred embodiments of the invention, it is to be understood that the invention is not limited to the precise method and apparatus, and that changes may be made therein without departing from the scope of the invention which is defined in the appended claims.

What is claimed is:

1. A method of burnishing blading members affixed to a central rotor used in rotating turbines and turbo machinery, the method comprising the steps of:
   positioning the rotor to permit the engagement of a burnishing tool with an individual blading member;
   engaging the burnishing tool with the blading member so as to simultaneously induce a desired compressive residual stress distribution in both sides of the blading member wherein said burnishing tool having an anterior surface shaped to facilitate insertion between the blading members to perform burnishing along the surface of the blading member;
   traversing the burnishing tool over the surface of the blading member to induce a continuous zone of compressive residual stress in the surface of the blading member;
   disengaging the burnishing tool from the blading member;
   rotating the rotor;
   repeating the process until compressive residual stress has been induced in each blading member affixed to the rotor.

2. The method of claim 1 wherein the continuous zone of compressive residual stress has a surface finish of substantially 5 μin. to 20 μin.

3. The method of claim 1 wherein the blading members are integrally formed with the rotor.

4. The method of claim 1 wherein the burnishing tool is a caliper-type burnishing tool comprising a pair of caliper arms in pivotal engagement with each other, each caliper arm having an interior surface and an exterior surface, the interior surface being contoured to conform to the surface of the blading member and having a burnishing element located thereon.

5. The method of claim 1 wherein the compressive residual stress extends substantially through the thickness of the blading member.

6. The method of claim 1 wherein the compressive residual stress zone extends substantially along the perimeter of the blading member and inwards, towards the center of the blading member.

7. The method of claim 1 wherein the interior surface of the burnishing tool is contoured to conform to the surface geometry of the blading member.

8. The method of claim 1 wherein the compressive residual stresses induced in the blading member have an associated cold work on the order of less than approximately 5%.

9. The method of claim 1 wherein the compressive residual stresses induced in the blading member have an associated cold work on the order of less than approximately 3.5%.

10. The method of claim 1 further comprising the step of inducing a desired compressive residual stress distribution along the leading edge and/or the trailing edge and/or the tip of the blading member.

11. The method of claim 1 wherein the burnishing tool operates under CNC control.

* * * * *